United States Patent
Miura et al.

(10) Patent No.: US 8,491,387 B2
(45) Date of Patent: Jul. 23, 2013

(54) APPARATUS AND METHOD FOR CLASSIFYING GROUPS OF USERS

(75) Inventors: Masayoshi Miura, Chiba (JP); Yoichiro Sako, Tokyo (JP); Susumu Yabe, Tokyo (JP); Motoyuki Takai, Tokyo (JP); Akiko Inoue, Saitama (JP)

(73) Assignee: Sony Corporation, Tokyo (JP)

( * ) Notice: Subject to any disclaimer, the term of this patent is extended or adjusted under 35 U.S.C. 154(b) by 582 days.

(21) Appl. No.: 12/705,364

(22) Filed: Feb. 12, 2010

(65) Prior Publication Data

US 2010/0144438 A1    Jun. 10, 2010

Related U.S. Application Data

(63) Continuation of application No. 10/555,183, filed as application No. PCT/JP2004/005030 on Apr. 7, 2004, now Pat. No. 7,686,690.

(30) Foreign Application Priority Data

May 7, 2003 (JP) ................. 2003-128564

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC ......................................... 463/36

(58) Field of Classification Search
USPC ............................................. 463/36
See application file for complete search history.

(56) References Cited

U.S. PATENT DOCUMENTS

| 5,229,764 | A | 7/1993 | Matchett et al. |
| 5,772,508 | A | 6/1998 | Sugita et al. |
| 6,352,479 | B1 | 3/2002 | Sparks, II |
| 6,702,286 | B1 * | 3/2004 | Darak ........................ 273/255 |
| 6,902,484 | B2 | 6/2005 | Idaka |
| 2002/0151365 | A1 * | 10/2002 | Walker et al. .............. 463/42 |
| 2004/0229685 | A1 * | 11/2004 | Smith et al. .................... 463/29 |
| 2005/0192097 | A1 | 9/2005 | Farnham et al. |

FOREIGN PATENT DOCUMENTS

| JP | 2001-340646 | 12/2001 |
| JP | 2002-18135 | 1/2002 |

* cited by examiner

*Primary Examiner* — David L Lewis
*Assistant Examiner* — Reginald Renwick
(74) *Attorney, Agent, or Firm* — Oblon, Spivak, McClelland, Maier & Neustadt, L.L.P.

(57) ABSTRACT

An apparatus and method to group users based on bio-information of the users. A two-dimensional bio-information space is generated from first and second dimensions which represent, respectively, first and second characteristics of the bio-information of the users. The users are arranged in the bio-information space based on the bio-information, and users are grouped based on the arrangement of the users in the bio-information space. Continuously acquired bio-information is used to re-group users.

14 Claims, 14 Drawing Sheets

FIG. 8

| | NAME | BIOSENSOR |
|---|---|---|
| PLAYER 1 | SMITH | 1 |
| PLAYER 2 | JOHN | 2 |
| PLAYER 3 | MARY | 1 |
| ⋮ | ⋮ | ⋮ |

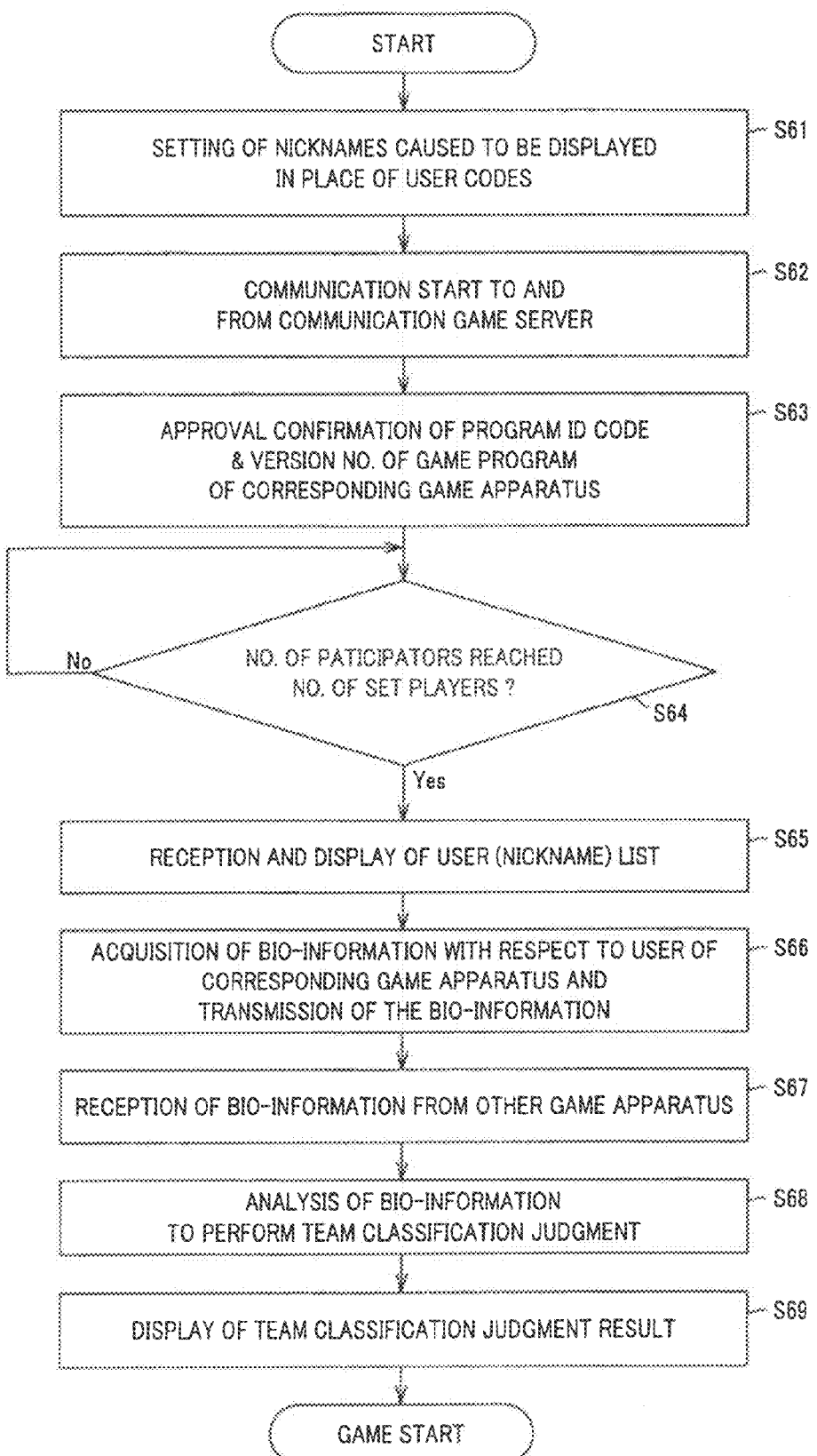

APPARATUS AND METHOD FOR CLASSIFYING GROUPS OF USERS

CROSS-REFERENCE TO RELATED APPLICATIONS

This Application is a continuation application of U.S. Ser. No. 10/555,183, filed Nov. 1, 2005, and claims priority under 35 U.S.C. §120 thereto. U.S. Ser. No. 10/555,183 is a National Stage application of PCT/JP04/05030, filed Apr. 7, 2004, and claims priority under 35 U.S.C. §119 to Japanese Patent Application No. 2003-128564, filed May 7, 2003. The entirety of each is incorporated herein by reference.

BACKGROUND

1. Technical Field

This application relates to a game apparatus adapted for providing fighting or versus fighting games performed by plural teams, and a team classification method in a fighting game.

2. Discussion of the Related Art

As a game provided by video game machine for business and video game machine for home, there is fighting game in which game is performed by plural teams. As a system of providing fighting game of this kind, there exist various forms thereof. Namely, there are instances where the system is constructed by single game machine. There are instances where the system is caused to be of configuration in which plural game machines are connected to each other. Further, there are instances where plural game machines and game server unit are connected by network.

Meanwhile, in the fighting game of this kind, game players (hereinafter simply referred to as player) conventionally determine teams or groups to which they belong to perform game. Namely, it is general to perform classification or division of players into teams (hereinafter simply referred to as team classification) in the state where the wills of the players are respected.

For example, in the Japanese Patent Application Laid Open No. 1997-155063 publication, there is disclosed a game system comprising an entry unit in which player selects, prior to start of game, an arbitrary team from plural teams to make an entry with respect to the game.

Meanwhile, in the case where wills of the players are respected as previously described at the time of performing team classification or grouping of players of the fighting game, there are instances where there may exist, to much degree, e.g., difference between fighting abilities (powers) of respective teams so that amusement as game is lost.

Moreover, when the number of participating players is increased, since it is necessary that respective players are required to perform entry operations, it takes much time in team classification.

Further, when persons who are not familiar with each other participate in the fighting game through the network, in the case where players are caused to designate teams by entry operation through the entry unit as described above, players cannot recognize criterion for choosing the team. Accordingly, it cannot be said that wills of the players are respected. As a result, the entry operation becomes wasteful. Thus, players rather feel the entry operation to be troublesome.

SUMMARY

An object of the present invention is to provide a game apparatus and a team classification method in the fighting game which provide novel fighting game which can solve problems that prior arts have.

Another object of the present invention is to provide a game apparatus and a team classification method in the fighting game which can solve troublesomeness of operation such as team designation by players, and which permit player to sufficiently enjoy amusement of the fighting game.

The game apparatus according to the present invention comprises: bio-information acquisition means for acquiring bio-information (bioinformation) of players of game; bio-information analysis means for analyzing the bio-information which have been acquired at the bio-information acquisition means; and team judgment means for judging teams to which players belong in accordance with analysis result of the bio-information which has been analyzed at the bio-information analysis means.

In the game apparatus according to the present invention, teams to which players who operate operation controllers belong are judged by analysis result of the bio-information acquired by the bio-information acquisition means. Accordingly, group input designation for player becomes unnecessary, and team to which players are classified or distributed is determined by bio-information. Accordingly, team classification can be made without damaging amusement of the fighting game such that players are distributed into unexpected team.

Still further objects of the present invention and practical merits obtained by the present invention will become more apparent from the description of the embodiments which will be given below with reference to the attached drawings.

BRIEF DESCRIPTION OF THE DRAWINGS

FIG. 8 is a view for explaining association between player and bio-information in the game apparatus according to the present invention.

FIG. 14 is a flowchart showing team classification judgment processing in further embodiment of the game apparatus according to the present invention.

DETAILED DESCRIPTION

A game apparatus and a team classification method in fighting game according to the present invention will now be explained with reference to the attached drawings.

First Embodiment

Independence Type

Figure 1:
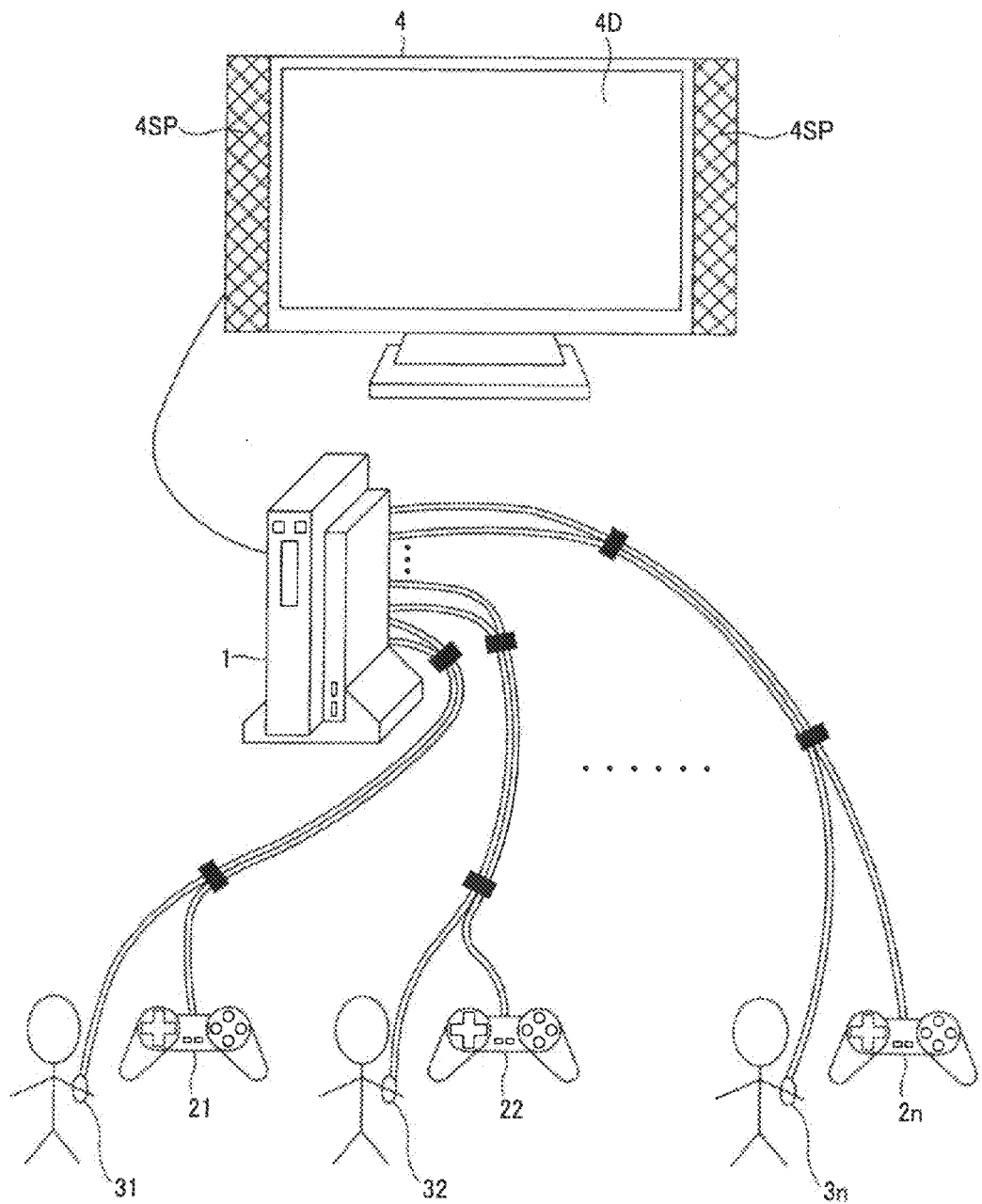
FIG. 1 is a view showing a configuration example of a game system using a game apparatus according to the present invention.

Initially, the first embodiment of the present invention will be explained. The game apparatus according to the first embodiment is a system constituted by a single game apparatus. This game system comprises, as shown in FIG. 1, a game apparatus body 1, operation controllers 21, 22, ..., 2n (n is integer of 1 or more. This similarly applies hereinafter), biosensors 31, 32, ..., 3n, and a monitor unit 4.

The monitor unit 4 is caused to be of the configuration of a display unit with speaker, wherein the display apparatus portion is comprised of LCD (Liquid Crystal Display), or CRT (Cathode Ray Tube), etc. In place of the monitor unit 4, a speaker unit and a display unit may be respectively separately provided.

Figure 2:
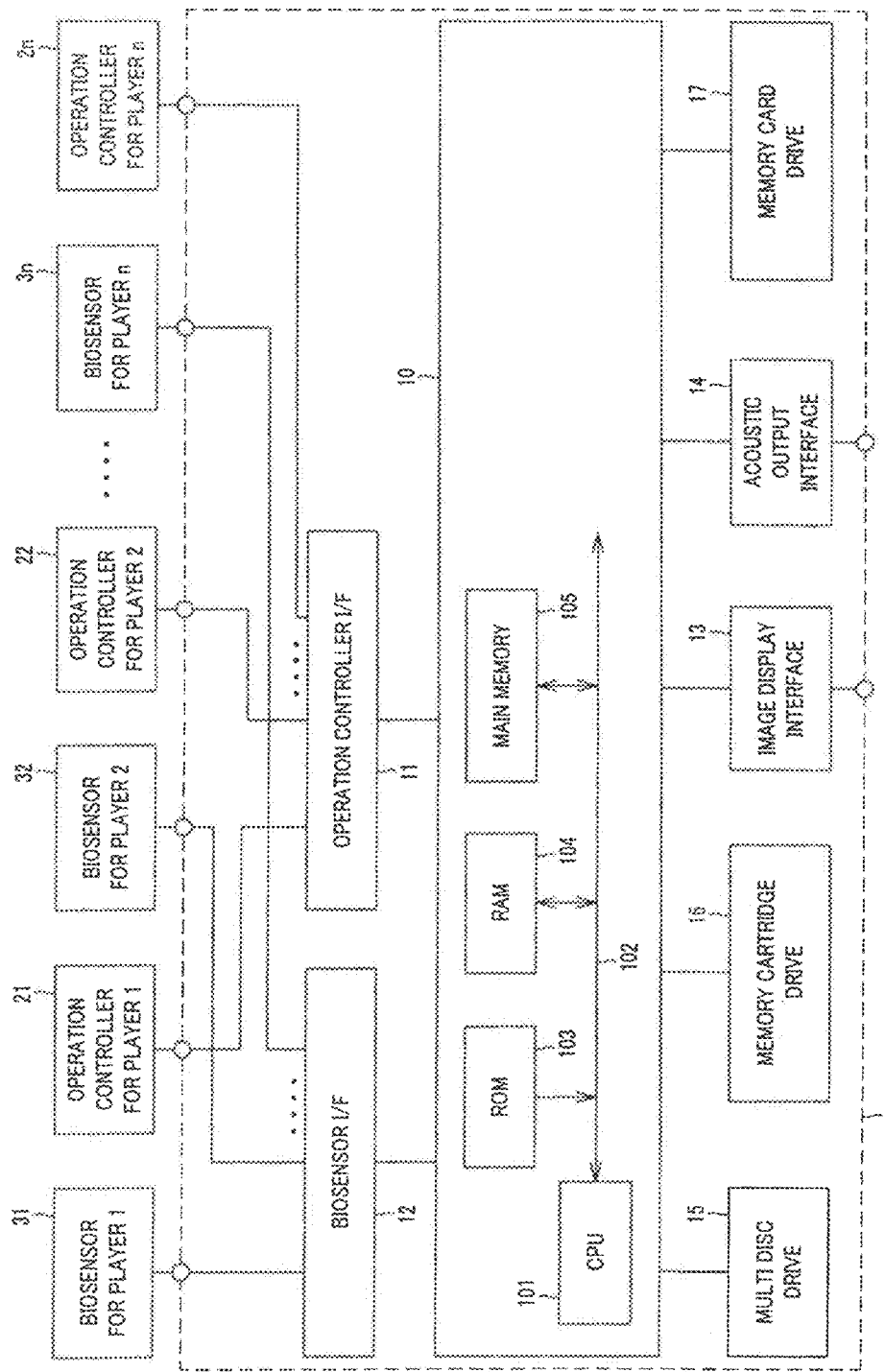
FIG. 2 is a block diagram showing the game apparatus according to the present invention.

As shown in FIG. 2, the game apparatus body 1 is caused to be of the configuration in which an operation controller interface 11, an interface 12 for biosensor, an interface 13 for image display, an interface 14 for sound (acoustic) output, a multi disc drive 15, a memory cartridge drive 16, and a memory card interface 17 are connected with respect to a control unit 10.

The control unit 10 is caused to be of the configuration comprising a microcomputer in which at least a ROM (Read Only Memory) 103 for program, a RAM (Random Access Memory) 104 for work area and a main memory 105 are connected to a CPU (Central Processing Unit) 101 through a system bus 102.

Respective operation controllers 21, 22, ..., 2n serve to input designation operations in the game such as movements of characters, etc. assigned to the operation controllers 21, 22, ..., 2n in the game, and are connected to the control unit 10 through the operation controller interface 11.

Moreover, respective biosensors 31, 32, ..., 3n are connected to the control unit 10 through the biosensor interface 12. The respective biosensors 31, 32, ..., 3n are an example of bio-information acquisition means, and serve to detect bio-information of players who operate the respective operation controllers 21, 22, ..., 2n.

Here, as bio-information detected at the respective biosensors 31, 32, ..., 3n, there may be employed any information profitable as information for performing team classification of players. For example, in addition to breath, myoelectricity, wink, body surface temperature, sweating of skin, skin resistance, pulse, cardioelectricity and/or heartbeat, etc., there may be mentioned, as an example of bio-information, biochemical reaction, brain waves, magneto-encephalogram, micro-vibration, blood pressure and/or body motion (movement), etc.

In this example, the respective biosensors 31, 32, ..., 3n are caused to be of the configuration such that they are loaded (attached) to wrist of players, etc. For example, body surface temperature, sweating of skin, skin resistance, pulse and/or micro-vibration, etc. are detected as bio-information.

It is to be noted that the method of detecting bio-information is not limited to a detection method of the type in which biosensor is attached to the human body to detect such bio-information as in the case of the biosensor of this example, but, e.g., body motion, breath, wink and/or body surface temperature, etc. may be detected by a non-contact detection method with respect to the human body using, e.g., optical sensor or video camera, etc.

In this example, the respective biosensors 31, 32, ..., 3n are associated with the respective operation controllers 21, 22, ..., 2n. Namely, in the game apparatus body 1, the operation controller 21 and the biosensor 31 are caused to be associated set so that this set is used for player 1, the operation controller 22 and the biosensor 32 are caused to be associated set so that it is used for player 2, ..., the operation controller 2n and the biosensor 3n are caused to be associated set so that it is used for player n.

In this example, at the game apparatus body 1, jacks for the operation controllers and the biosensors which constitute the above-mentioned associated sets are adjacently provided (illustration is omitted), and cables connected to the operation controllers and cables connected to the biosensors, which constitute the above mentioned associated sets, are bundled each other as shown in FIG. 2 so that association (correspondence) relationship is clarified.

Thus, players insert plugs provided at the leading ends of cables of the operation controllers and the biosensors which constitute associated sets into jacks respectively corresponding thereto. The control unit 10 recognizes that the operation controller and the biosensor in which plugs are inserted into corresponding jacks are associated with each other.

The program or programs for controlling the games is or are stored in CD-ROM (Compact Disc-ROM), DVD-ROM (Digital Versatile Disc-ROM) or external memory medium such as memory cartridge, etc.

The CD-ROM or the DVD-ROM is loaded into the multi-disc drive 15. By instruction from the control unit 10, program for controlling the game (hereinafter referred to as game program) is read out, and is loaded into a main memory 105 of the control unit 10. Thus, the game is executed. Moreover, in the case of the memory cartridge, the memory cartridge is loaded into the cartridge drive 16. As a result, the game program is read out by instruction from the control unit 10, and is loaded into the main memory 105 of the control unit 10. Thus, game is executed.

A display image signal from a display image signal processing circuit 13 is delivered to display unit section of the monitor unit 4, and a sound (acoustic) output signal from a sound output signal processing circuit 14 is delivered to a speaker 4SP through an amplifier at the monitor unit 4.

A display image signal is delivered, through an image display interface 13, to the display unit section of the monitor unit 4 in accordance with control of the control unit 10, which corresponds to the game program. Thus, image indicating development situation of the game and/or instruction with respect to player are displayed on the screen 4D thereof.

Moreover, a sound output signal is delivered to the speaker 4SP of the monitor unit 4 through the sound output interface 14 in accordance with control of the control unit 10, which corresponds to the game program. Thus, sound (acoustic) information presented in correspondence with development of the game is outputted, as sound, from the speaker 4SP.

The memory card is loaded into the memory card drive 17. For example, game data and/or bio-information which have been acquired from the players during game as described later are written into the memory card, and are preserved therein.

[Explanation of the Operation of the Game Apparatus]

<Flow from Start to End (Over) of Game>

Then, explanation will be given by making reference to the flowchart of FIG. 3 of the flow start to end (over) of the game.

Initially, in order to start the game, when the CD-ROM or DVD-ROM in which the game program has been stored is loaded into the multi-disc drive 15, or the memory cartridge in which the game program has been stored is loaded into the memory cartridge drive 16, the control unit 10 serves to read out the game program from the CD-ROM or the DVD-ROM, or the memory cartridge to load it into the main memory 105 (step S1).

Then, the control unit 10 performs initialization of game for starting the game (step S2). In this initialization, the control unit 10 performs a display to hasten player to input setting items on the display screen 4D to accept input of the setting items. In this case, in place of picture display, or in addition to picture display, message for allowing player to hasten input of setting items may be outputted by sound from the speaker 4SP.

Further, in this initialization, in a manner as described later, team classification judgment indicating teams to which respective players participating in the game belong is performed on the basis of analysis result of bio-information from the biosensors 31, 32, . . . , 3n.

Then, the control unit 10 waits that game start operation is performed (step S3). When it is discriminated that game start operation has been performed, the control unit 10 starts the game to execute it. (step S4).

Further, the control unit 10 discriminates whether or not team classification re-judgment request has taken place from game program during game execution (step S5). When it is discriminated that team classification re-judgment request has taken place, re-judgment of team classification is performed on the basis of analysis results of bio-information from the biosensors 31, 32, . . . , 3n with respect to respective players (step S6) as described later.

When it is discriminated at the step S5 that team classification re-judgment request does not take place, the control unit 10 discriminates whether or not game over instruction has taken place (step S7). When it is discriminated that game over instruction has not taken place, processing returns to the step S4 to continue the game. When it is discriminated that game over instruction has taken place, the processing routine of FIG. 3 is completed.

First Example of Team Classification Processing

[Team Classification Judgment Processing at the Time of Initialization]

Then, the team classification judgment processing in the initialization at the step S2 of FIG. 3 will be explained with reference to the flowchart shown in FIG. 4.

The control unit 10 first outputs message hastening player to load or attach biosensor to players by display of the display screen 4D of the monitor unit 4 and/or sound outputted from speaker 4SP (step S11). Then, the control unit 10 confirms the operation of the biosensor to detect biosensor or biosensors which has or have been attached (step S12). When the biosensor is attached to the player, the control unit 10 confirms the operation of the biosensor by making use of the fact that bio-information which is not noise can be detected, and detects the loaded or attached biosensor.

Then, the control unit 10 outputs, to player, data input for association between operation controller and biosensor and player which have been associated so as to constitute set, e.g., message to instruct input of name of player by display of display screen 4D of the monitor unit 4 and/or sound outputted from the speaker 4SP (step S13). In this example, this is because team name, etc. is notified in correspondence with name of player in notifying team classification judgment result to player.

Then, the control unit 10 waits completion of data input such as names of all players participating in the game, etc. (step S14), whereby when it is discriminated that data input has been completed, the control unit 10 stores association between operation controller and biosensor, and player which have been associated in order to constitute set into, e.g., RAM 104 to set such association relationship (step S15)

Then, in this example, the control unit 10 reads out image information for acquiring corresponding bio-information from player, which is preserved in the main memory 105, to display such image information on the screen 4D of the monitor unit 4 (step S16). Here, as image information for acquiring corresponding bio-information from player, there is used, e.g., image information, etc. by which it is possible to perform, e.g., psychological test or character judgment of player.

Further, the control unit 10 detects, from respective biosensors attached to respective players, respective bio-information of players who have looked at display of the screen 4D of the monitor unit to analyze the bio-information thus detected. (step S17).

Further, teams to which respective players are caused to belong are judged from analysis results of bio-information of respective players participating in the game (step S18) to display the judgment results on the screen 4D of, e.g., monitor unit 4 in a manner associated with names of respective players which have been inputted at the step S13 to notify them to players (step S19). By sound from the speaker 4SP, in addition to the picture display, or in place of the picture display, how judgment with respect to teams to which players belong is made may be notified.

It is to be noted that in the case where small displays, e.g., LCDs, etc. are attached to respective operation controllers 21, 22, . . . , 2n, teams to which players who operate the respective operation controllers 21, 22, . . . , 2n may be displayed on the small displays.

In the case where display is made on displays attached to operation controllers in this way, players can recognize teams to which they belong without making display in the state where team names and player names are associated with each other.

Moreover, in the case where display is made only on respective LCDs of the operation controllers 21, 22, . . . , 2n without displaying teams to which respective players belong on the monitor unit 4, there can result the state where except for players who operate respective operation controllers 21, 22, . . . , 2n, players cannot recognize teams to which corresponding players belong. Accordingly, there is the advantage that the team to which the player belongs can be remained to be unknown until game is started so that amusement of the game is increased.

As a method of analyzing bio-information at steps S17 and S18 to judge team to which player belongs, there may be used, e.g., a method as described below.

For example, respective biosensors 31, 32, . . . , 3n are caused to be of the configuration comprised of plural biosensors so as to have ability to detect plural kinds of bio-information. In the case where respective biosensors 31, 32, . . . , 3n are assumed to be comprised of k (k is integer of 2 or more)

number of biosensors, measurement data of bio-information with respect to respective players result in k-th dimensional bio-information data.

Namely, when respective bio-information obtained from the k number of bio-sensors are assumed as biodata 1, biodata 2, ..., biodata k, measurement data with respect to respective players can be represented as k-dimensional bio-information data (biodata 1, biodata 2, ..., biodata k).

On the other hand, plural dimensional bio-information spaces are constructed from plural kinds of bio-information obtained from plural biosensors. Further, teams to which respective players belong are judged by arrangement of measurement data of bio-information with respect to respective players at bio-information spaces thereof.

Namely, for example, in the case where $$\text{coordinate } 1 = a1(\text{biodata } 1) + a2(\text{biodata } 2) + \ldots + ak(\text{biodata } k)$$
$$\text{coordinate } 2 = b1(\text{biodata } 1) + b2(\text{biodata } 2) + \ldots + bk(\text{biodata } k) \cdots,$$

the m-th dimensional bio-information space coordinates are represented by space coordinates (coordinate 1, coordinate 2, ..., coordinate m). a1, a2, ..., ak and b1, b2, ... bk are coefficients including 0 (zero).

For example, with respect to respective players, five kinds of bio-information, e.g., pulse, No. of breaths, body temperature, sweating and wink are respectively measured to calculate, as data of coordinate 1, linear sum of pulse, body temperature and sweating among the measured respective data, and to calculate, as data of coordinate 2, linear sum of the No. of breaths and wink. For example, since pulse, body temperature and sweating are increased when excited, the coordinate 1 can be regarded as coordinate representing "degree of enthusiasm". Moreover, since the number of breaths and wink are not so changed if player is cool, the coordinate 2 can be regarded as coordinate representing "degree of coolness".

Further, two-dimensional bio-coordinate space coordinate (coordinate 1, coordinate 2) are constructed as bio-information space coordinate to arrange measurement data of bio-information of respective players on the coordinate space constituted by the two-dimensional bio-coordinate space coordinate (coordinate 1, coordinate 2). Further, respective players are divided into groups for team classification on the basis of arrangement state of measurement data of bio-information of respective players on the bio-coordinate space.

As a method of grouping respective players arranged within bio-information space, there are, as a first method, a method of allowing players close to each other at arrangement position to belong to the same group to collect similar players into one group, and, as a second method, a method of allowing players close to each other at arrangement position to belong to different groups to nullify group difference, etc. In the case of a method of collecting players close to each other at arrangement position to divide them into groups, technique of the cluster analysis can be used.

Figure 5:
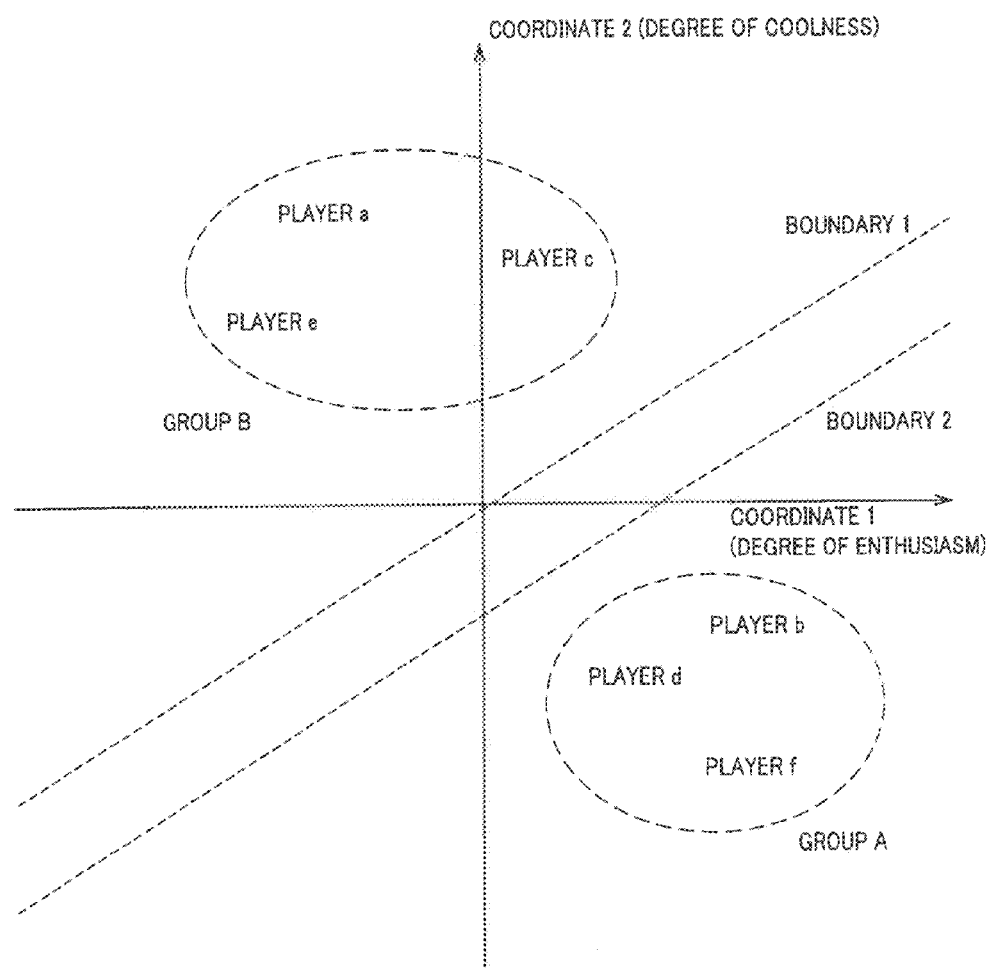
FIG. 5 is a view for explaining team classification judgment in the game apparatus according to the present invention.

FIG. 5 shows an example of grouping in the case of the above-described first method, and shows the state where measurement data of bio-information of respective players are arranged within coordinate space consisting of coordinate 1 of "degree of enthusiasm" and coordinate 2 of "degree of coolness" to collect players close to each other at the arrangement position as group A and group B.

Accordingly, when grouping of players is performed within bio-information space as in the case of the example shown in FIG. 5, there is provided fighting composition of "cool team" versus "enthusiastic team". Further, in the case of grouping by the previously described second method, fighting between teams such that cool members and enthusiastic members are equally arranged at respective teams can be realized.

Example of Team Classification Change Processing During Game

As previously described, in this embodiment, fighting game program is constituted so as to send out team classification re-judgment request to the control unit 10 of the game apparatus body 1 during game.

Here, re-judgment request of team classification takes place, e.g., in game program, when game development reaches a predetermined scene (first case), or coincides with a predetermined condition in game development (second case).

An example of the former (first case) is the case where the game develops from the first stage to the second stage, or the case where game scene changes, etc. Moreover, as an example of the latter (second case), there are mentioned, as an example, the cases where game state coincides with the conditions such as the case where players (game characters) become close to each other within a predetermined distance in the field of the game during game, the case where victory or defeat of game is apt to be determined, and the case where powers of teams are comparable so that victory or defeat of the game is not easily determined, etc.

When such team classification re-judgment request is made, the control unit 10 of the game apparatus body 1 re-takes thereinto, in the case of the example of the first case, bio-information with respect to all players to analyze the bio-information which have been thereinto to perform team classification re-judgment from the analysis result thereof. Moreover, in the case of the example of the second case, the control unit 10 re-takes thereinto bio-information with respect to players who have matched with the condition to analyze the bio-information which have been taken thereinto to perform team classification re-judgment from the analysis result thereof.

Figure 6:
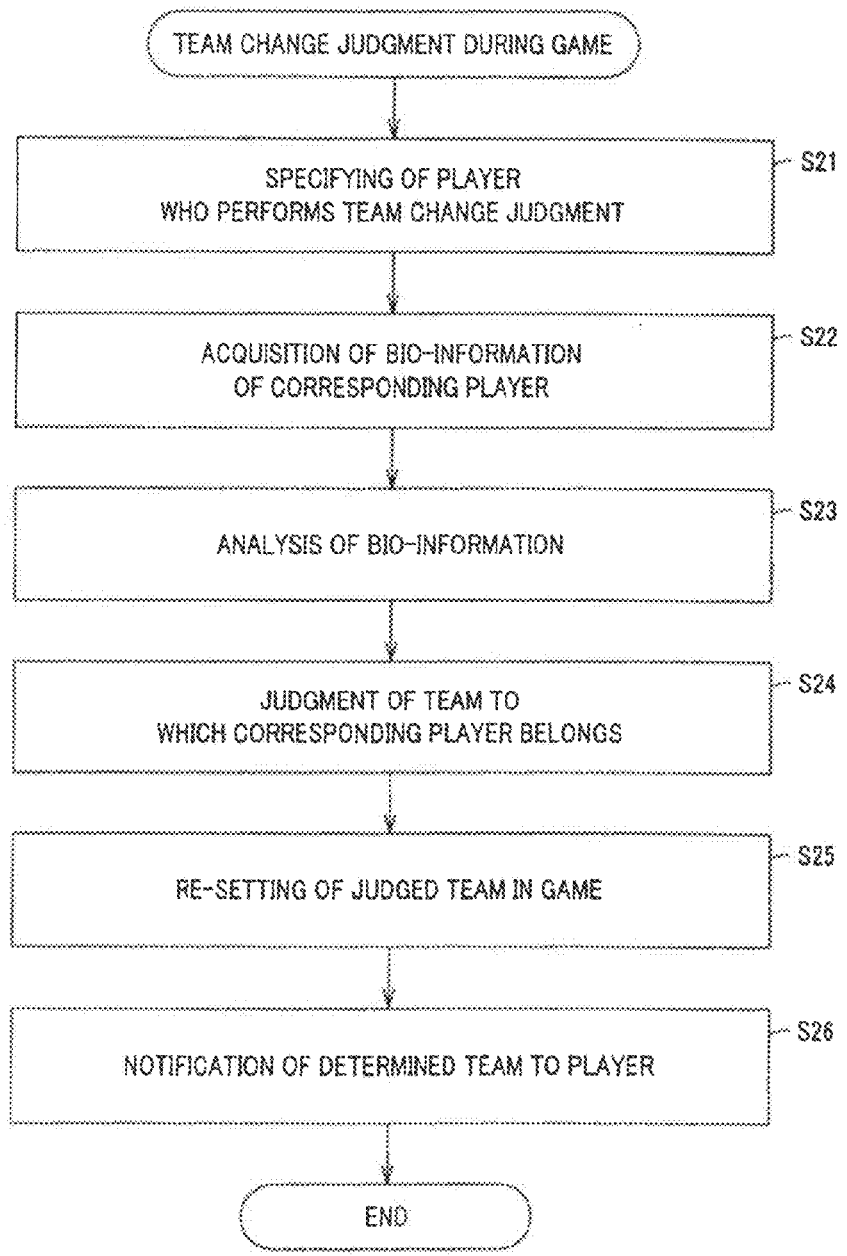
FIG. 6 is a flowchart showing team classification change processing in the middle of game in the game apparatus according to the present invention.

FIG. 6 is a flowchart of team change judgment during game executed at the control unit 10 in accordance with the team classification re-judgment request.

Namely, first, player who performs team change judgment is specified (step S21). In the case of the above-described first case, all players are specified as player who performs team change judgment. In the case of the second case, player who has matched with the condition is specified. These information for specifying players are transferred to the control unit 10 when the game program indicates team classification re-judgment request.

Then, the control unit 10 detects, by biosensor, bio-information with respect to player specified as a player who performs team classification judgment (step S22). Then, respective detected bio-information are analyzed in a manner as described above (step S23) to perform re-judgment of teams to which respective players specified as players who perform team classification judgment belong on the basis of the analysis result thereof (step S24).

Further, its re-judgment result is reflected with respect to game program (step S25). Moreover, team name judged by the re-judgment with respect to player specified as a player or person who performs team classification judgment is notified to the player by display of the display screen 4D of the monitor unit 4 and/or sound outputted from the speaker 4SP (step S26).

It is to be noted that in the case where display is attached at the operation controller as previously described also at the step S26, notification may be made with respect to player only at the corresponding operation controller. In that case, only player himself who has been caused to undergo team change knows that the team has been changed, and it is possible to conceal that team change with respect to other players.

In a manner as stated above, in this embodiment, team classification change is made on the basis of bio-information of player during development of game. Since bio-information of players change with lapse of time, arrangement of players at bio-information space changes with lapse of time. Accordingly, it becomes possible to change group to which player belongs at the time point of start of the game and in the middle thereof.

By such sudden team change of player during development of game, it can be expected that amusement of game is increased such that there results new development in the progress of game.

It is to be noted that in the case where change of grouping is performed during progress or development of the game, when group change takes place too frequently, operation of the game becomes troublesome, also resulting in the possibility that amusement of the game may be halved. To solve such problem, in this example, when groups to which players belong are changed, boundaries between these groups are caused to have hysteresis characteristic with respect to change thereof.

Namely, in FIG. 5, boundary position in the case where belonging group is changed from group A to group B and the boundary position in the case where belonging group is changed from group B to group A in a manner opposite to the above are caused to be different from each other. For example, in FIG. 5, as the boundary in the case where assignment is changed from the group A to the group B, there is employed boundary 1 closer to the group B side. Conversely, as the boundary when assignment is changed from the group B to the group A, there is employed boundary 2 closer to the group A side. When such a method is employed, it is possible to avoid that change of the belonging group is frequently produced. Thus, the problem of troublesomeness can be eliminated.

Other Example of Team Classification Change Processing During Game

While there is employed, in the above-described embodiment, a method in which when team change request takes place during game by game program, the game apparatus body 1 acquires and analyzes bio-information on the basis of the team change request thereof to notify team change result by the analysis result thereof with respect to the game program to thereby reflect the team change with respect to the game, the team change method is not limited to such method.

In another example of the team classification change processing, the control unit 10 of the game apparatus body 1 takes in and analyzes bio-information with respect to players, e.g., at predetermined time interval during game to perform team judgment every player on the basis of the analysis result thereof. As previously described, since bio-information of player changes with lapse of time, arrangement of players at the bio-information space changes with lapse of time, and judgment result of team to which player belongs also changes with lapse of time.

In view of the above, in another example of the team classification change processing, the control unit 10 serves to judge, from team belonging information every players which have been judged at the predetermined time period, whether or not team changes take place with respect to respective players to transmit the team change results to the game program to reflect the team changes with respect to the games.

In the case of this example, the game program is constituted as software adapted to accept team change request from the control unit 10 of the game apparatus body 1 to reflect change of team setting with respect to the game. In this case, the game program may be software configuration such that when team change request is accepted, the team change request thus accepted is immediately reflected with respect to the game, but may be software configuration in which after waiting until timing suitable as team change after team change request is accepted, such team change is reflected with respect to the game.

While it is better also at another example of team classification change processing that team change is not caused to take place more than required, there may be used, as a method therefor, a method such that when team change does not exceed the boundary for a predetermined time or more, assignment is not changed. In the case of such a method, when team (group) change is above the boundary only by short time, belonging group is not changed. It is to be noted that boundaries 1 and 2 having hysteresis are used also as the boundary in this case similarly to the example of the previously described team classification change processing.

Second Example of Team Classification at the Time of Initialization

Team Classification Processing at the Time of Initialization

While, in the team classification processing at the time of initialization in the first example of the above-described team classification processing, player himself who operates operation controller judges team to which the player belongs on the basis of bio-information thereof in such a manner that operation controllers and biosensors are caused to be associated with each other, corresponding player may judge team to which he belongs by using bio-information of other player in place of bio-information of the player himself.

Figure 3:
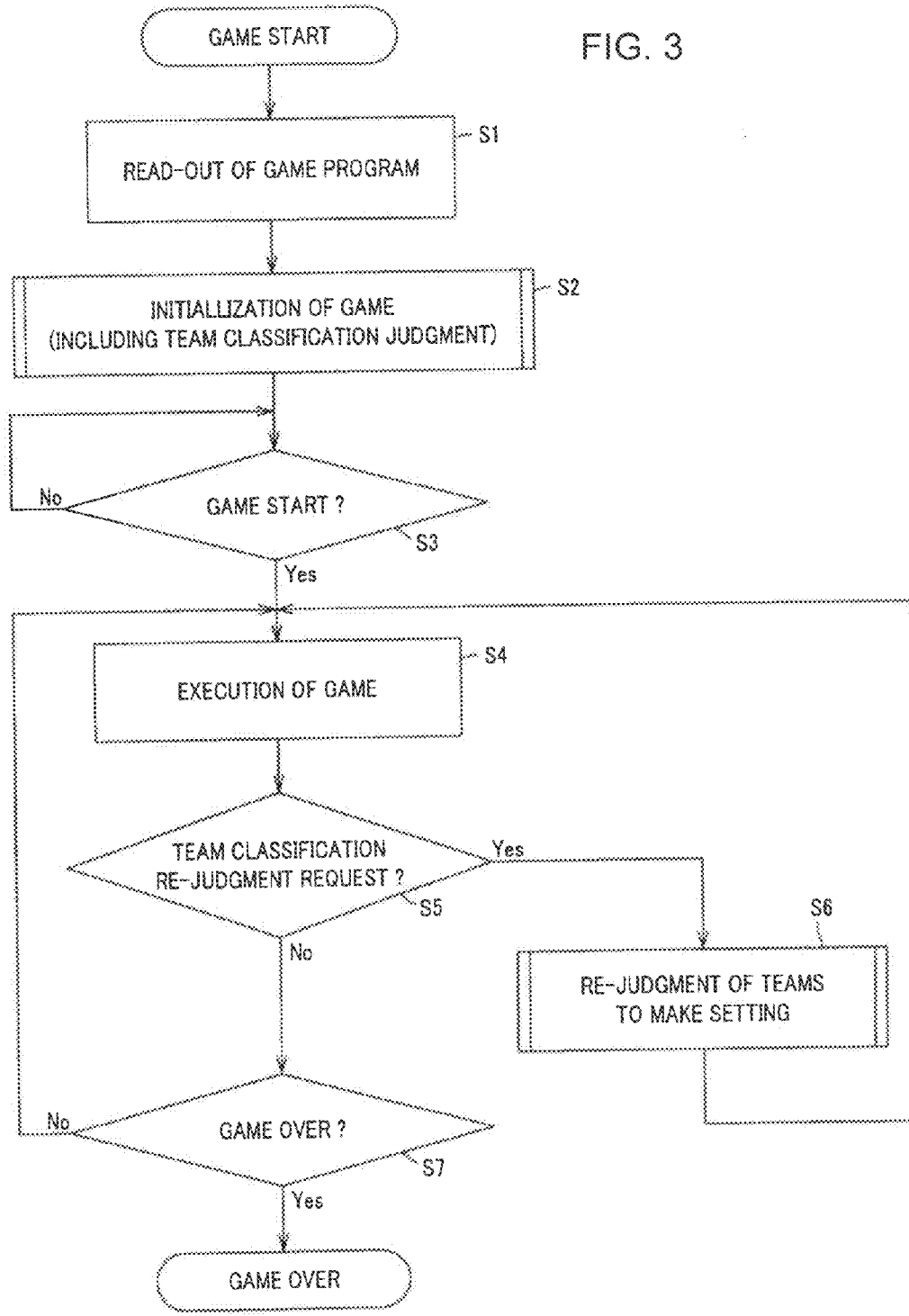
FIG. 3 is a flowchart showing flow of game processing in the game apparatus according to the present invention.
Figure 4:
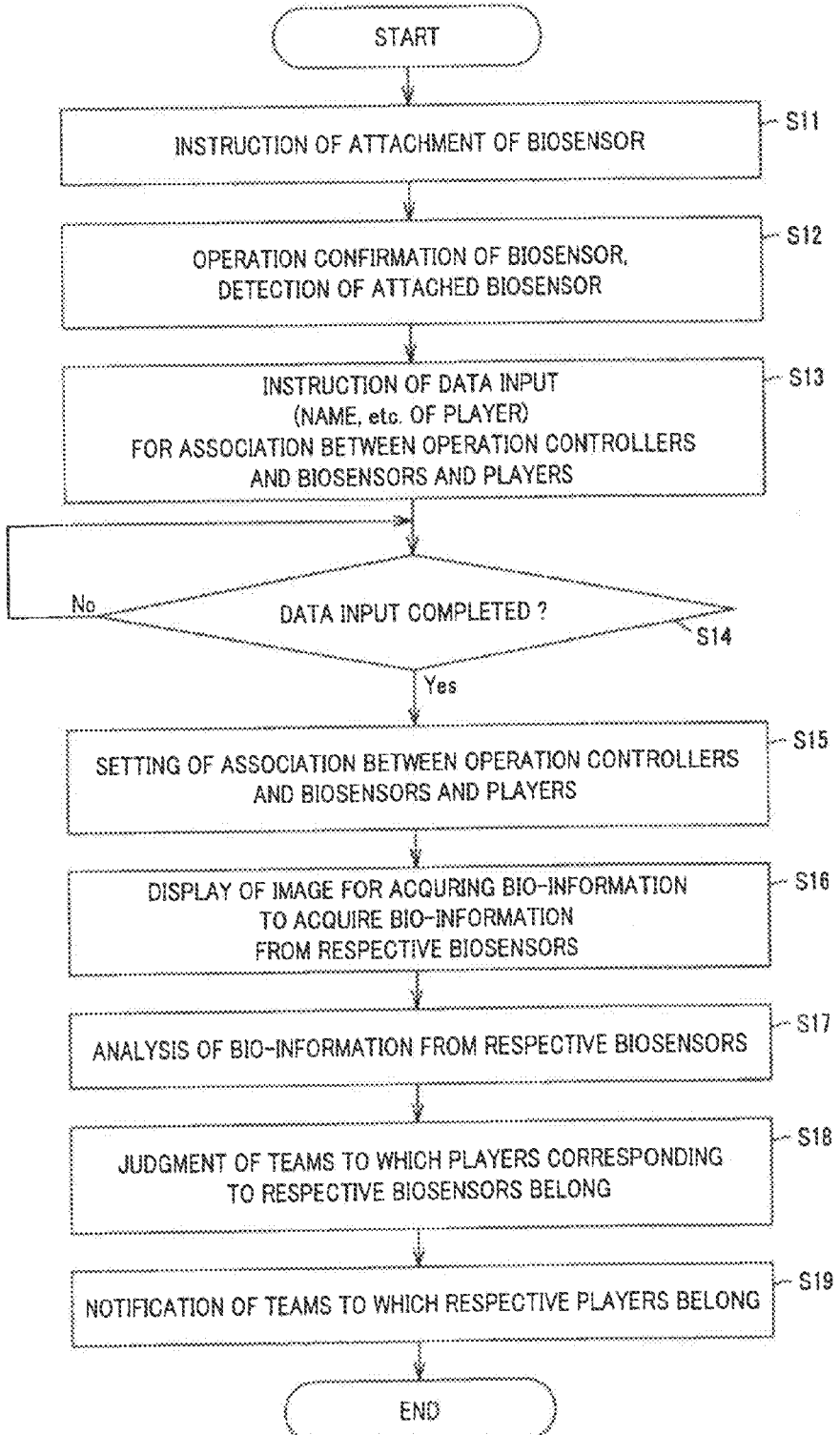
FIG. 4 is a flowchart showing team classification judgment processing at the time of game initialization in the game apparatus according to the present invention.
Figure 7:
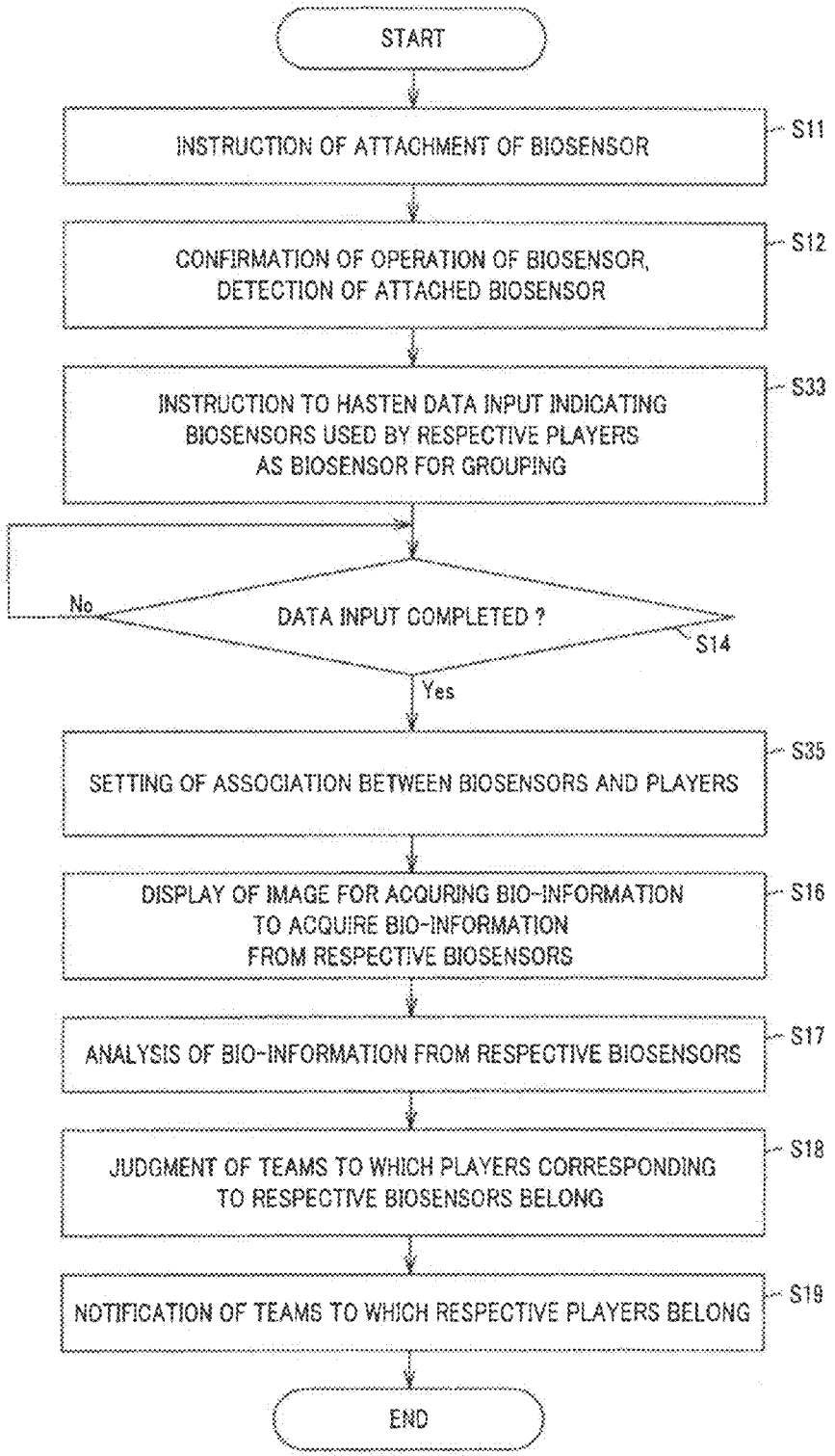
FIG. 7 is a flowchart showing another example of team classification judgment processing at the time of game initialization in the game apparatus according to the present invention.

FIG. 7 is a flowchart for explaining team classification processing in the initialization at the step S2 of FIG. 3 in the case of this example. The flowchart shown in FIG. 7 is entirely the same as the flowchart of FIG. 4 in other steps except that step S13 of the flowchart shown in FIG. 4 is changed into step S33, and the step S15 thereof is changed into step S35.

Namely, in this example, at the step S33, e.g., as shown in the display example of display screen 4D of the monitor unit of FIG. 8, picture to hasten inputs of names of respective players and inputs of biosensors is displayed. Here, the player 1 means player who operates operation controller 21, and the player 2 means player who operates operation controller 22, . . . .

Further, while the biosensor 31 is caused to be associated with the operation controller 21 as previously described as initialization in this example, association between the operation controller and the biosensor may be changed. Namely, in the case where setting of association between the operation controller and the biosensor is not changed, the initialization entirely becomes similar to that of the above-described first example.

In the example of FIG. 8, there is shown the state where number of biosensor with respect to player 3 "MARY" who operates the operation controller 23 is changed from initially set value "3" to "1". Accordingly, with respect to the player 3 "MARY" who operates the operation controller 23, team classification judgment is performed on the basis of bio-information from the biosensor attached to the player 1 "SMITH" who operates the operation controller 21.

At step S35, since association between the operation controller and the biosensor is judged at the step S15 of the case of the previously described first example, association between those members and player names is set. However, in the case of this example, since association between the operation controller and the biosensor is released, association between the operation controller and player who operates it is set, and association between player who operates corresponding operation controller and biosensor is set.

By making such setting, since the player 3 "MARY" is caused to undergo team classification by bio-information of the player 1 "SMITH", the player 3 is permitted to belong to a team which is not a team that player himself excepts. Even in usual game, there can be provided different form.

[Team Classification Change Processing During Game]

Further, in the case of this example, also in the team change judgment with respect to player in the middle of game as previously described, there is used analysis result of bio-information from biosensor that player except for player himself who is associated by setting in the initialization attaches. Accordingly, with respect to player, assignment may be changed into unexpected team at an unexpected timing. Thus, variety can be given to progress and/or development of game.

It is to be noted that while judgment of belonging team of player is performed by using bio-information from the same biosensor both at the time of game start and during game in the above-described explanation, bio-information serving as criterion of team judgment may be changed at the time of game start and during game.

For example, at the time of starting the game, judgment of belonging team may be performed on the basis of bio-information of player himself who operates the operation controller to perform change judgment of belonging team on the basis of bio-information of other player which has been set in advance before game start, or which has been set in the middle of game on picture of FIG. 8 during game.

Moreover, in a manner opposite to the above, at the time of starting the game, on the picture of FIG. 8, judgment of belonging team may be performed on the basis of bio-information of other player which has been set in advance before game start to perform change judgment of belonging team on the basis of bio-information of player himself who operates the operation controller during game.

Further, at the time of starting game, belonging team is judged on the basis of the will of the player. However, in the middle of game, change judgment of belonging team may be performed on the basis of bio-information of player himself or other player in the middle of game. In this case, in the case where association between operation controller and biosensor is taken in advance as in the above-described embodiment, it is unnecessary to set, before game start in advance or in the middle of the game, association between player and biosensor in belonging team change processing in the middle of the game when bio-information of player himself is used. However, in the case where bio-information from the biosensor that other player attaches is used, it is necessary to make setting before game start in advance or in the middle of game in a manner similar to the above.

Third Example of Team Classification Processing

In the above-described example, player executes the game in the state where biosensor is attached. Accordingly, bio-information of player during game execution can be obtained at all times from the biosensor. In view of the above, bio-information of player during game execution can be stored with respect to memory medium such as disc medium or memory card, etc.

In this example, in FIG. 1, there is employed a configuration in which bio-information of player during game execution can be stored at the memory card loaded into the memory card drive 17. In this case, respective bio-information are stored in a manner associated with player names which have been set at initialization.

Moreover, memory card in which bio-information of famous person who has executed the game, etc. may be also offered to user along with selling of memory cartridge, CD-ROM or DVD-ROM in which game programs are recorded.

In this example, team classification of player is performed by using bio-information stored in the memory card. Accordingly, in accordance with this example, attachment of the biosensor which it often happens that the player feels troublesome can become unnecessary.

[Team Classification Processing at the Time of Initialization]

The team classification processing in the initialization at the step S2 of FIG. 3 in the case of this example will be explained with reference to the flowchart of FIG. 9.

Figure 9:
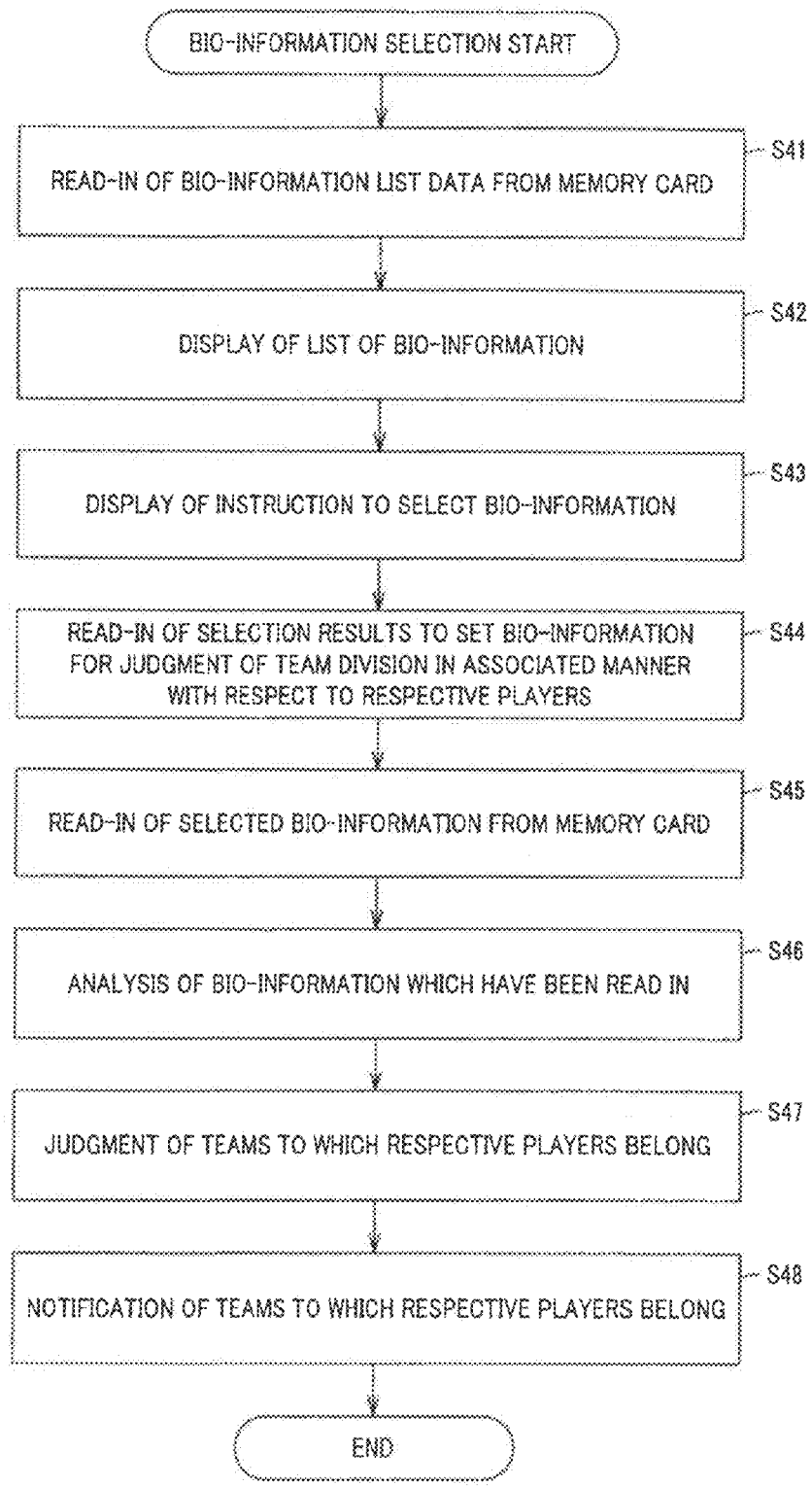
FIG. 9 is a flowchart showing another example of team classification judgment processing at the time of game initialization in the game apparatus according to the present invention.

When the mode for utilizing bio-information from the memory card is selected, the flowchart of FIG. 9 is started. The control unit 10 first reads thereinto list data of bio-information stored in the memory card from the memory card (step S41) to display list of the bio-information on the display screen 4D of the monitor unit 4 (step S42). The list of the bio-information is a list of names of respective players in which bio-information when corresponding game was executed in the past are stored.

Then, the control unit 10 outputs such a message to hasten player to select, from list data, bio-information to be associated with player by display of the display screen 4D of the monitor unit 4 and/or sound outputted from the speaker 4SP (step S43). In the selective designation performed here, name of player himself who operates the operation controller is first inputted thereafter to input of bio-information of person (player) to be stored for use as bio-information used for team judgment of corresponding player.

Then, the control unit 10 reads thereinto selected designation result of player to store bio-information to be associated into, e.g., RAM 104 as bio-information for team classification of respective players to set the bio-information thus stored (step S44).

Then, the control unit 10 reads thereinto bio-information which has been selected in correspondence with respective players from the memory card (step S45) to analyze bio-information which has been read thereinto (step S46).

Further, teams to which associated respective players are caused to belong are judged from analysis results of respective bio-information (step S47) to display the judgment result on the screen 4D of, e.g., monitor unit 4 in such a manner associated with name of the player himself who operates the operation controller, which has been inputted at the step S43, to notify it to the player (step S48). By sound from the speaker 4SP, in addition to the picture display, or in place of the picture display, judgment result indicating team to which player belongs may be notified.

Also in the case of this example, in the case where small displays, e.g., LCD, etc. are attached to respective operation controllers 21, 22, . . . , 2n, teams to which players who operate the respective operation controllers 21, 22, . . . , 2n belong may be displayed on the small displays.

Example of Team Classification Change Processing During Game

In the case of the third example, also in the team change judgment with respect to player in the middle of game as previously described, there is used bio-information stored in the memory card, which has been associated by setting in the initialization. Namely, when team re-judgment request with respect to player takes place in the middle of the game, past bio-information corresponding to the game scene is read out. The bio-information which has been read out is analyzed. Thus, team classification judgment is performed.

Accordingly, with respect to player, assignment is changed into an unexpected team at an unexpected timing. Thus, variety can be given to progress and development of game. Further, player can enjoy game as if he takes the place of player selected as bio-information for judgment of the own belonging team.

Also in the case of this example, similarly to the case of the previously described second example, at the time of starting the game, judgment of belonging team may be performed on the basis of bio-information of the player himself who operates the operation controller, and change judgment of belonging team may be performed on the basis of bio-information which has been selected and set from bio-information stored in the memory card before game start in advance during game.

Moreover, in a manner opposite to the above, at the time of starting game, before game start in advance, judgment of belonging team may be performed on the basis of bio-information which has been selected and set from bio-information stored in the memory card, and judgment of belonging team may be performed on the basis of bio-information of player himself who operates the operation controller during game.

Further, while judgment of belonging team is performed on the basis of will of player at the time of starting game, change judgment of belonging team may be performed on the basis of bio-information which has been selected and set from bio-information stored in the memory card before game start in advance, or in the middle of game.

In this case, in the case where association between the operation controller and the biosensor is taken in advance as in the above-described embodiment, when bio-information of player himself is used, it is unnecessary to set association between player and biosensor in belonging team change processing in the middle of game before game start in advance, or in the middle of game. However, in the case where bio-information from the biosensor that other player has attached is used, it is necessary to make setting before game start in advance, or in the middle of the game similarly to the above.

It is to be noted that, in the third example, stored bio-information of all players who participate in the game are not set as bio-information for team classification of players, but those of partial player or players may be set. In that case, with respect to other players, the previously described first and second examples are applied thereto.

Second Embodiment

Network Type

Then, the second embodiment of the present invention will be explained. In place of enjoying the fighting game by a single game apparatus as in the previously described first embodiment, the second embodiment is directed to the case where plural game apparatuses are connected through network line so that the system is constructed.

Figure 10:
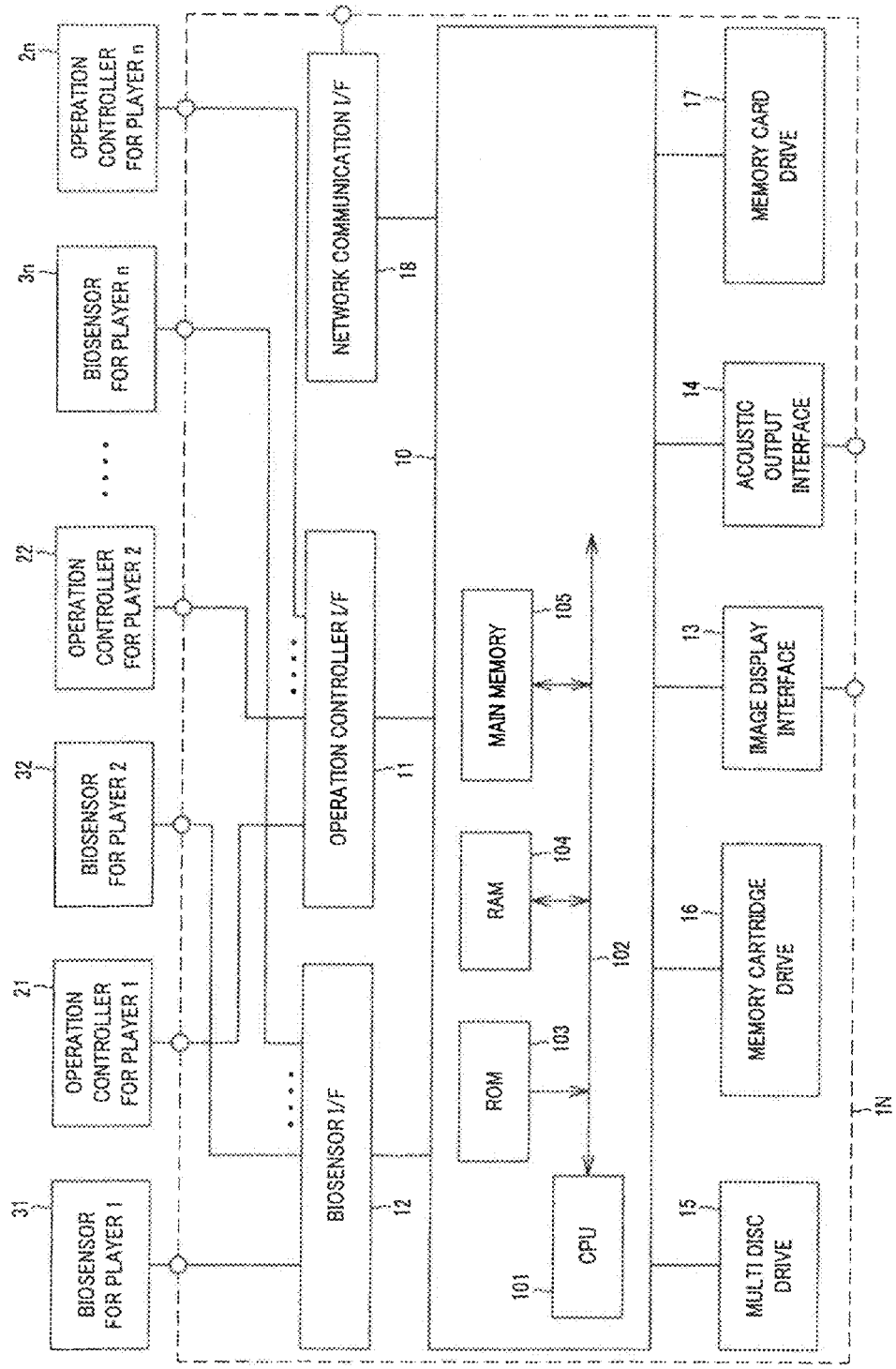
FIG. 10 is a block diagram showing a further embodiment of the game apparatus according to the present invention.

FIG. 10 is a block diagram showing a configuration example of the embodiment of game apparatus 1N which complies with such network. The configuration of FIG. 10 is different from game apparatus 1 of the previously described first embodiment only in that network communication interface 18 is provided, and software for performing transmission/reception of game data, etc. through network is provided in the ROM 13, but are entirely the same in other components.

The network communication interface 18 is connected to the control unit 10, and is connected to communication line. The network communication interface 18 comprises buffer for transmit data, and buffer for receive data. Information taking place at the own game apparatus are sent out to the communication line through the transmit data buffer, and information from other game apparatuses sent through the communication line are taken in through the receive data buffer.

As a form where game apparatuses are connected to each other through communication line, there is the case of the system configuration in which plural game apparatuses are connected to each other through communication cable, and the case where players of plural game apparatuses enjoy the same game in a shared manner through server unit via Internet.

Figure 11:
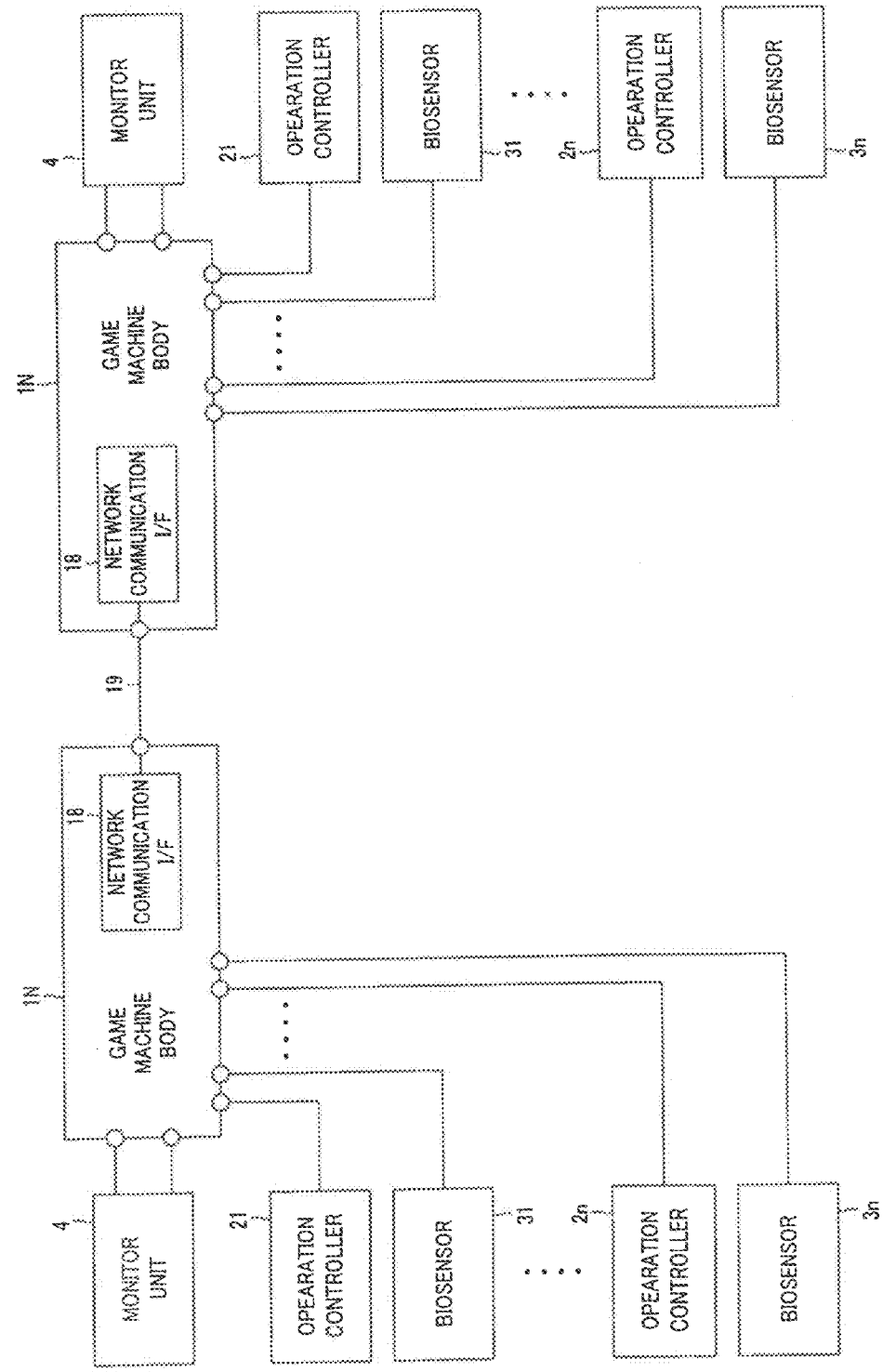
FIG. 11 is a view showing a system configuration example including another embodiment of the game apparatus according to the present invention.

FIG. 11 shows the state where two game apparatuses 1N are connected through a communication cable 19. In the case where three game apparatuses 1N or more are connected, they are cascade-connected (sweet potato vine-connected).

Here, two game apparatuses or more can be connected to communication line. The respective game apparatuses are caused to be of the configuration to perform transmission/reception of transmit data and receive data so that they all have the same data environment.

For example, game change information such as motion (movement) change, etc. of character during game is transmitted from respective game apparatuses to all other game apparatuses connected to communication line through transmit data buffer. Further, the respective game apparatuses acquire game change information from other game apparatuses through receive data buffer to reflect such information with respect to the game. Accordingly, in all game apparatuses connected through communication line, there result the same game environments.

Figure 12:
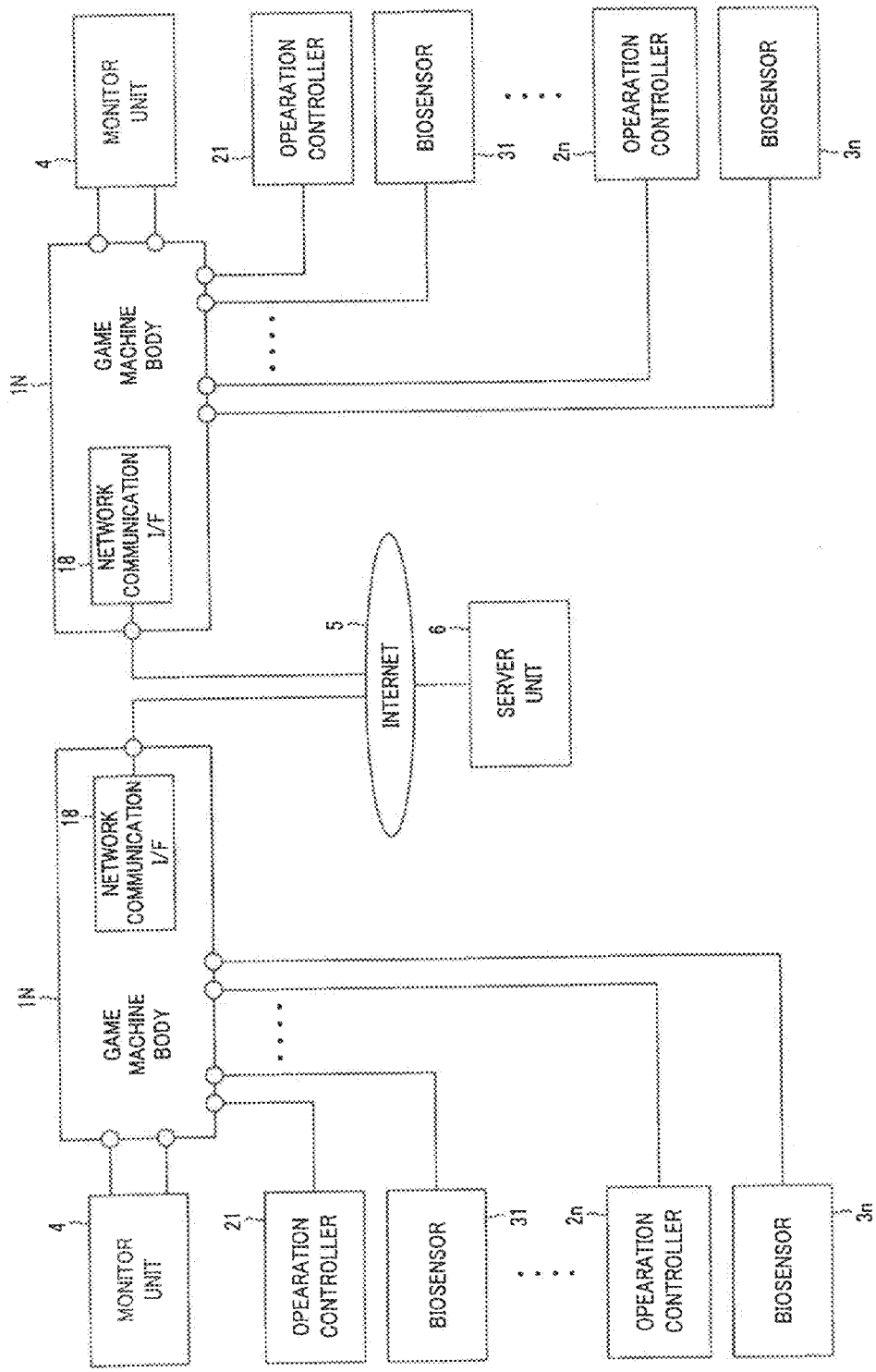
FIG. 12 is a view showing a system configuration example including a further embodiment of the game apparatus according to the present invention.

FIG. 12 shows a system configuration example in the case where the communication line includes Internet, and server unit is caused to intervene thereat. Namely, network communication interfaces 18 of respective game units 1N are respectively connected to the server unit 6 through the Internet 5.

In the case of this example, game program is loaded into respective game apparatuses from the server unit 6. Further, e.g., game change information such as movement change, etc. of character during game is transmitted to the server unit 6 through transmit data buffer and through Internet from respective game apparatuses. The server unit 6 transmits game change information which have been collected from the respective game units to all game apparatuses through the Internet 5.

The respective game apparatuses acquire game change information from the server unit 6 through the receive data buffer to reflect such information with respect to the game. Accordingly, in all game apparatuses connected through communication line, there result the same game environments.

First Example of Team Classification

In the example of team classification processing in the case of this example, as in the previously described first to third examples, respective game apparatuses serve to judge, on the basis of bio-information, teams to which respective players belong to notify judgment result to player of corresponding game apparatus in a manner previously described, and to transmit belonging team information every respective players which have been judged to all other game apparatuses connected to the communication line through transmit data buffer.

The respective game apparatuses acquire belonging team information of respective players from other game apparatuses through receive data buffer to reflect the information thus acquired with respect to the game. Accordingly, in all game apparatuses connected through the communication line, there result the same game environments.

Figure 13:
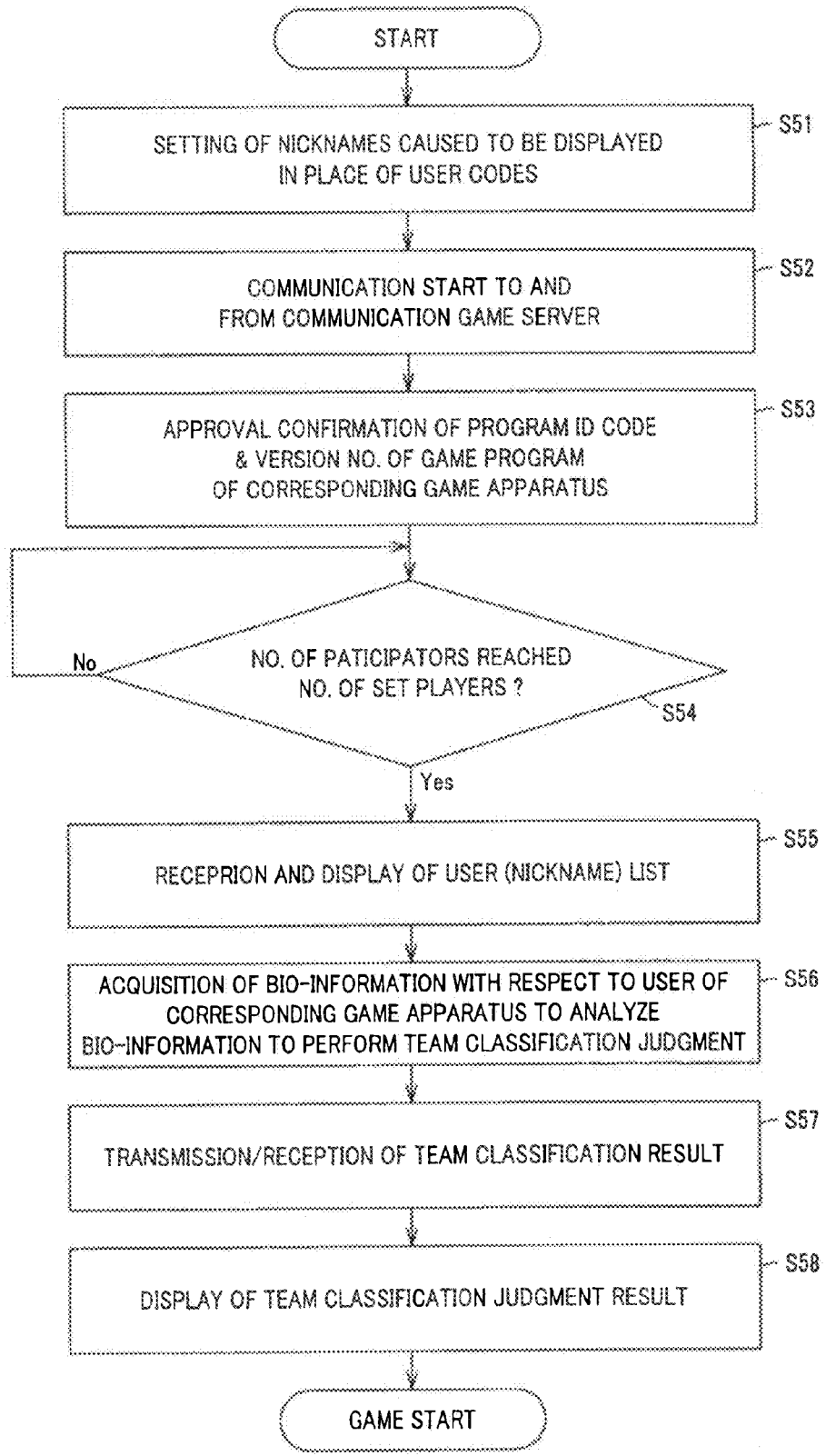
FIG. 13 is a flowchart showing team classification judgment processing in another embodiment of the game apparatus according to the present invention.

FIG. 13 is a flowchart showing team judgment processing that respective game apparatuses perform in the case of the game system where server unit is caused to intervene in the first example of this team classification.

First, the control unit 10 sets, at the own terminal, nickname caused to be displayed in place of user code with respect to user (player) participating in the game (step S51). The nicknames are set every players who operate the operation controllers. The control unit 10 may automatically perform setting of the nicknames in correspondence with respective operation controllers, or the player may perform such setting by inputting corresponding nickname.

Then, the control unit 10 provides access to the server unit 6 to start communication for communication game (step S52). In this communication, nicknames with respect to users (players) who participate in the game are sent to the server unit 6. The server unit 6 counts the number of game participators by the number of nicknames.

Then, the control unit 10 inquires program ID code and version No. of the game program of the own apparatus to the server unit 6 to take approval confirmation (step S56). In the case of this example, this processing is executed because it is required that game programs of all game apparatuses which perform communication game are entirely the same.

Then, the control unit 10 awaits that notification indicating that No. of participators in the game reaches No. of set players is coming from the server unit 6 (step S54). When arrival of notification indicating that No. of participators in the game reaches the No. of set players is confirmed, nickname list of users (players) who participate in the game is received from the server unit 6 to display the nickname list on the display screen 4D of the monitor unit 4 (step S55).

Then, the control unit 10 acquires bio-information with respect to players participating in the game who operate operation controller connected to the own terminal to analyze the bio-information thus acquired to execute team classification processing in a manner as previously described (step S56). As a method of acquiring bio-information at this time, not only the method of acquiring bio-information from the biosensor as previously described, but also a method of acquiring bio-information from the memory card may be employed.

Then, the control unit 10 transmits team classification judgment results with respect to respective players which have been judged at the step S56 to the server unit 6 in such a manner that they are respectively associated with nicknames, and receives team classification judgment results sent from the server unit 6 (step S57). At this time, the team classification judgment result sent from the server unit 6 consists of team classification judgment results from all game apparatuses (team classification judgment results caused to correspond to the nicknames).

Further, the control unit 10 displays the team classification judgment results which have been received from the server unit 6 on the display screen 4D of the monitor unit 4 in a manner associated with respective nicknames of the nickname list (step S58).

In a manner as stated above, in this example, in all game apparatuses, team classification judgment results with respect to participators of the communication game are commonly judged to notify the judgment results thus obtained to respective players.

It is to be noted that team classification judgment results sent from the server unit 6 to respective game apparatuses may be team classification judgment results from which judgment result or results at corresponding game unit or units is or are excluded. In that case, in respective game apparatuses, team classification judgment result determined at the own apparatus and team classification judgment result received from the server unit 6 are displayed on the display screen 4D of the monitor unit 4 in a manner associated with respective nicknames of the nickname list.

It is to be noted that, in the first example, also when team classification change request as previously described takes place, team classification change processing are performed at respective game apparatuses similarly to the above to notify the processing result thus obtained to all game apparatuses through the server unit so that games are executed in the same environments at all game apparatuses.

While team classification judgment results with respect to all players who participate in the game are displayed on, e.g., display screen of the monitor unit 4 to notify them in the explanation of the above-described examples, it is only required to notify team classification judgment results with respect to players who operate operation controllers connected to respective game apparatuses.

Second Example of Team Classification

In the second example of team classification processing in the case of this example, as in the case of the previously described first to third examples, respective game apparatuses serve to analyze bio-information not only to judge, on the basis of the bio-information thus obtained, teams to which respective players belong, but also to receive bio-information with respect to players from other game apparatuses to analyze the bio-information to judge, on the basis of the result, teams to which respective players belong to notify the judgment results thereof to the players.

In this case, respective game apparatuses transmit bio-information with respect to players who operate operation controllers connected to the game apparatuses to all other game apparatuses, or the server unit.

In the case of this example, it is essential that game apparatuses are caused to be of the same configuration. This is because team classification judgments based on analysis results of bio-information are entirely the same result in all game apparatuses. Accordingly, in all game apparatuses connected through the connection line, there result the same game environments.

FIG. 14 is a flowchart of team judgment processing that respective game apparatus perform in the case of the game system where the server unit is caused to intervene in the second example of the team classification.

Steps S61 to S65 of FIG. 14 are entirely the same as the steps S51 to S55 of FIG. 13.

In the second example, the control unit 10 serves to acquire bio-information with respect to players who participate in the game, who operate operation controllers connected to own terminals to send out the bio-information thus acquired to the server unit 6 in a manner associated with respective nicknames (step S66). As a method of acquiring bio-information at this time, the method of acquiring such bio-information from the biosensor as previously described, but also a method of acquiring such information from the memory card may be also employed.

Then, the control unit 10 receives bio-information from other game apparatus, which is sent from the server unit 6 (step S67). Further, the control unit 10 serves to analyze respective bio-information acquired with respect to the own apparatuses and respective received bio-information in a manner previously described above to execute team classification judgment processing on the basis of the analysis result thereof (step S68).

Then, the control unit 10 displays team classification judgment result at the step S68 on the display screen 4D of the monitor unit 4 in a manner associated with respective nicknames of the nickname list (step S69).

In a manner as stated above, in this example, in all game apparatuses, team classification judgment results with respect to participators of the communication game are commonly judged to notify them to respective players.

In the second example, when team classification change request as previously described takes place in the middle of the game, bio-information of players subject to team classification change are transmitted to other game apparatus through the server unit 6 to perform team classification change processing at respective game apparatuses similarly to the above so that the games are executed in all game apparatuses.

It should be noted that while team classification judgment results with respect to all players who participate in the game are displayed on the display screen of, e.g., the monitor unit 4, and are notified in the explanation of the above-described example, it is only required to notify team classification judgment results with respect to at least players who operate operation controllers connected to respective game apparatuses.

Third Example of Team Classification

While team classification judgments are all performed at the game apparatus in the above-mentioned first and second examples, team classification judgment processing may be performed at the server unit 6.

Namely, in the third example, respective game apparatuses transmit bio-information with respect to players to the server unit 6 in a manner associated with the nicknames.

When the server unit receives all bio-information with respect to players who participate in the game from all game apparatuses, it analyzes those information in a manner similar to the previously described example to perform team classification judgment on the basis of the analysis result thereof.

Further, the server unit transmits the team classification judgment result to all game apparatuses.

When respective game apparatuses receive the team classification judgment result, they display those team classification judgment results in a manner associated with nicknames on the display screen 4D of the monitor unit 4 to notify them to respective players.

It is to be noted that, in the third example, when team classification change request as previously described take place in the middle of game, the server unit 6 collects bio-information of players subject to team classification change from the game apparatuses to perform team classification change processing at the server unit in a manner as described above to notify such information to respective game apparatuses so that games are executed in the same environments at all game apparatuses.

It is to be noted that while team classification judgment results with respect to all players who participate in the game are displayed on the display screen of, e.g., monitor unit 4 to notify those judgment results in the explanation of the above-described example, it is only required to notify team classification judgment results with respect to at least players who operate operation controllers connected to respective game apparatuses.

Other Embodiments

It is to be noted that communication between game apparatuses or between game apparatus and server unit may be performed through wireless line without intervention of cable. Moreover, in the case where the server unit and game apparatuses are connected through Internet, etc., the portion connected to telephone line may be caused to be wireless connecting unit to connect the wireless connecting unit and the game apparatuses therebetween by radio network.

In addition, while the biosensor is attached to the wrist of player in the above-described embodiment, biosensor may be attached to the operation controller so that player only has the operation controller to thereby have ability to detect bio-information. Moreover, player may be photographed by camera to thereby have ability to detect, as bio-information, body motion (movement) or to detect, as bio-information, body surface temperature. Further, bio-information such as breath, etc. may be detected by vibration sensor such as microphone, etc.

It should be noted that while breath, body surface temperature, sweating of skin, skin resistance and/or pulse, etc. are used as bio-information in the above-described explanation, the bio-information is limited to these information, but, e.g., biochemical reaction, brain waves, magneto-encephalogram, micro-vibration and/or blood pressure, etc. may be acquired as bio-information in addition to, e.g., body motion (movement), myoelectricity, cardioelectricity and/or heartbeat, etc.

In addition, as bio-information, it is unnecessary to acquire plural kinds of information as in the case of the above described example, but, e.g., only body motion, only breath or only heartbeat may be employed.

It is to be noted that while the present invention has been described in accordance with certain preferred embodiments thereof illustrated in the accompanying drawings and described in detail, it should be understood by those ordinarily skilled in the art that the invention is not limited to embodiments, but various modifications, alternative construction or equivalents can be implemented without departing from the scope and spirit of the present invention as set forth by appended claims.

INDUSTRIAL APPLICABILITY

As described above, in accordance with the present invention, since teams to which players who operate the operation controllers belong are judged by analysis result of bio-information acquired by the bio-information acquisition means, group input designation of players becomes unnecessary, and teams in which players are to be classified is determined by bio-information. Accordingly, team classification can be made without damaging amusement of the fighting game such that distribution or classification into unexpected team is made, etc.

The invention claimed is:

1. A group classification method, comprising:
    generating, by a processor of an information processing apparatus, a two-dimensional bio-information space from first and second dimensions which represent, respectively, first and second characteristics of bio-information of users;
    arranging the users, based on the bio-information, in the bio-information space; and
    determining groups of the users, thereby establishing teams of the users, based on the arranging of the users in the bio-information space;
    executing a game in which the teams compete against each other, wherein the establishing teams of the users is performed prior to a start of the game;
    continuously acquiring, by an interface of the information processing apparatus, updated bio-information of the users during the game;
    re-arranging the users amongst the teams, based on the updated bio-information, in the bio-information space; and
    re-establishing the teams of the users based on the re-arranging of the users in the bio-information space.

2. The method according to claim 1, wherein the determining includes classifying the users into groups based on a proximity of the users in the bio-information space.

3. The method according to claim 2, wherein proximate users in the bio-information space are classified in a same group.

4. The method according to claim 2, wherein furthest users in the bio-information space are classified in a same group.

5. The method according to claim 1, further comprising:
    acquiring plural kinds of bio-information as the bio-information of the users, the plural kinds of bio-information including at least one of body motion, myoelectricity, heart rate, breathing rate, body surface temperature, skin perspiration, skin resistivity, microvibrations, cardioelectricity, blood pressure and blinking rate.

6. The method according to claim 1, wherein the generating the bio-information space includes:
    selecting first and second subsets of different kinds of the bio-information commonly representing the first and second characteristics, respectively, of the bio-information;
    generating first and second coordinates representing, respectively, the first and second characteristics; and
    arranging the first and second coordinates as, respectively, first and second dimensions of the bio-information space.

7. A non-transitory computer readable storage medium including executable instructions, which when executed by a processor, cause the processor to perform a group classification method, the method comprising:
    generating a two-dimensional bio-information space from first and second dimensions which represent, respectively, first and second characteristics of bio-information of users;
    arranging the users, based on the bio-information, in the bio-information space; and
    determining groups of the users, thereby establishing teams of the users, based on the arranging of the users in the bio-information space;
    executing a game in which the teams compete against each other, wherein the establishing teams of the users is performed prior to a start of the game;
    continuously acquiring, by an interface of the information processing apparatus, updated bio-information of the users during the game;
    re-arranging the users amongst the teams, based on the updated bio-information, in the bio-information space; and
    re-establishing the teams of the users based on the re-arranging of the users in the bio-information space.

8. An information processing apparatus, comprising:
    a generating unit configured to generate a two-dimensional bio-information space from first and second dimensions which represent, respectively, first and second characteristics of bio-information of users;
    an arranging unit configured to arrange the users, based on the bio-information, in the bio-information space; and
    a determining unit configured to group the users, thereby establishing teams of the users, based on the arranging of the users in the bio-information space;
    an executing unit configured to execute a game in which the teams compete against each other, wherein the establishing teams of the users is performed prior to a start of the game;
    an acquiring unit configured to continuously acquire, by an interface of the information processing apparatus, updated bio-information of the users during the game; and
    a re-arranging unit configured to re-arrange the users amongst the teams, based on the updated bio-information, in the bio-information space, wherein
    the determining unit is configured to re-establish the teams of the users based on a re-arranging of the users in the bio-information space.

9. The apparatus according to claim 8, wherein the determining unit classifies the users into groups based on a proximity of the users in the bio-information space.

10. The apparatus according to claim 9, wherein proximate users in the bio-information space are classified in a same group.

11. The apparatus according to claim 9, wherein furthest users in the bio-information space are classified in a same group.

12. The apparatus according to claim 8, further comprising:
    the interface to continuously acquire the updated bio-information of the users.

13. The apparatus according to claim 8, further comprising:
    an interface to acquire plural kinds of bio-information as the bio-information of the users, the plural kinds of bio-information including at least one of body motion, myoelectricity, heart rate, breathing rate, body surface temperature, skin perspiration, skin resistivity, microvibrations, cardioelectricity, blood pressure and blinking rate.

14. The apparatus according to claim 8, wherein:
the generating unit is further configured to select first and second subsets of different kinds of the bio-information commonly representing the first and second characteristics, respectively, of the bio-information, and to generate first and second coordinates representing, respectively, the first and second characteristics; and
the arranging unit is further configured to arrange the first and second coordinates as, respectively, first and second dimensions of the bio-information space.

* * * * *